United States Patent
Rubens et al.

(10) Patent No.: US 11,167,951 B2
(45) Date of Patent: Nov. 9, 2021

(54) AUTOMATIC MECHANICAL SPOOL CHANGER FOR 3-D PRINTERS

(71) Applicant: Robert Bosch Tool Corporation, Broadview, IL (US)

(72) Inventors: Jeremy Rubens, Palatine, IL (US); Daniel John Blythe, Palatine, IL (US); Chris R. Dvorak, Chicago, IL (US)

(73) Assignees: ROBERT BOSCH TOOL CORPORATION, Mount Prospect, IL (US); ROBERT BOSCH GMBH, Stuttgart (DE)

( * ) Notice: Subject to any disclaimer, the term of this patent is extended or adjusted under 35 U.S.C. 154(b) by 886 days.

(21) Appl. No.: 15/633,913

(22) Filed: Jun. 27, 2017

(65) Prior Publication Data
US 2018/0002134 A1 Jan. 4, 2018

Related U.S. Application Data

(60) Provisional application No. 62/356,995, filed on Jun. 30, 2016.

(51) Int. Cl.
*B33Y 30/00* (2015.01)
*B29C 64/321* (2017.01)
(Continued)

(52) U.S. Cl.
CPC ........... *B65H 67/02* (2013.01); *B29C 64/321* (2017.08); *B33Y 30/00* (2014.12); *B33Y 40/00* (2014.12); *B29C 64/118* (2017.08)

(58) Field of Classification Search
CPC ..... B29C 64/321; B29C 64/118; B33Y 30/00; B33Y 40/00
See application file for complete search history.

(56) References Cited

U.S. PATENT DOCUMENTS

| | | | | |
|---|---|---|---|---|
| 4,259,144 A | * | 3/1981 | Ballentine | B29C 70/388 156/522 |
| 5,340,433 A | * | 8/1994 | Crump | B29C 41/36 156/578 |

(Continued)

FOREIGN PATENT DOCUMENTS

| | | | | |
|---|---|---|---|---|
| CN | 103950202 A | | 7/2014 | |
| CN | 104690967 A | * | 6/2015 | ........... B29C 64/118 |

(Continued)

OTHER PUBLICATIONS

Ufton Jake Samuel; WO-2016055523-A1 (document in English); "A Module for Additive Manufacturing Apparatus"; 2016 (Year: 2016).*

(Continued)

*Primary Examiner* — Francisco W Tschen
*Assistant Examiner* — Edgaredmanuel Troche
(74) *Attorney, Agent, or Firm* — Norton Rose Fulbright US LLP; Gerard Messina; Aaron Grunberger

(57) ABSTRACT

An automatic mechanical spool changer for 3-D printers includes a filament guide and a pre-loading device. The input to the filament guide receives at least a primary filament from a primary spool and a secondary filament from a secondary spool. The output from the filament guide connects to an extruder, and the output from the filament guide sequentially and automatically provides the primary filament and then the secondary filament to the extruder. The pre-loading device exerts a pre-loaded force on the secondary filament during the extrusion of the primary filament. After the primary filament passes a predetermined location within the filament guide, the force exerted on the secondary filament threads the secondary filament through the output of the filament guide and into the extruder.

2 Claims, 15 Drawing Sheets

(51) Int. Cl.
  *B33Y 40/00* (2020.01)
  *B29C 64/118* (2017.01)
  *B65H 67/02* (2006.01)

(56) References Cited

U.S. PATENT DOCUMENTS

| | | | | |
|---|---|---|---|---|
| 8,308,101 | B2* | 11/2012 | McCowin | B29C 70/384 |
| | | | | 242/423.1 |
| 10,207,462 | B1* | 2/2019 | Fields | B33Y 40/00 |
| 2001/0030383 | A1 | 10/2001 | Swanson | |
| 2001/0038168 | A1 | 11/2001 | Swanson et al. | |
| 2007/0228590 | A1* | 10/2007 | LaBossiere | B33Y 30/00 |
| | | | | 264/40.1 |
| 2009/0274540 | A1* | 11/2009 | Batchelder | B29C 64/106 |
| | | | | 414/431 |
| 2014/0263534 | A1* | 9/2014 | Post | B29C 64/227 |
| | | | | 226/196.1 |
| 2015/0037446 | A1* | 2/2015 | Douglass | B29C 67/0055 |
| | | | | 425/131.1 |
| 2015/0084222 | A1* | 3/2015 | Heston | B29C 64/118 |
| | | | | 264/40.7 |
| 2015/0183161 | A1* | 7/2015 | Molinari | B29C 64/118 |
| | | | | 425/375 |
| 2015/0231829 | A1* | 8/2015 | Haider | B33Y 40/00 |
| | | | | 700/119 |
| 2016/0257051 | A1* | 9/2016 | Pappas | B29C 48/82 |
| 2018/0304532 | A1* | 10/2018 | Burnham | B33Y 10/00 |

FOREIGN PATENT DOCUMENTS

| | | | | |
|---|---|---|---|---|
| CN | | 104690967 A1 | 6/2015 | |
| CN | | 104816472 A1 | 8/2015 | |
| CN | | 106042380 A * | 10/2016 | |
| WO | WO-2016055523 A1 * | 4/2016 | | B23K 26/0648 |

OTHER PUBLICATIONS

Igor Drstvensek; English Translation of CN-106042380-A retrieved from Espacenet; "Method for switching material feeding of printing head of 3D printer"; (2016) (Year: 2016).*

Spring (device) NPL1—From Wikipedia (Year: 2004).*

Li Shiqiang; English Translation of CN-104690967-A retirved from Espacenet; "Three-dimensional printer and three-dimensional printing method"; (2015) (Year: 2015).*

International Search Report dated Oct. 11, 2017, of the corresponding International Application PCT/EP2017/065960 filed Jun. 28, 2017.

* cited by examiner

AUTOMATIC MECHANICAL SPOOL CHANGER FOR 3-D PRINTERS

CROSS-REFERENCE TO RELATED APPLICATION

This application claims the benefit of U.S. Provisional Application No. 62/356,995, which was filed on Jun. 30, 2016, and which is hereby incorporated herein by reference in its entirety.

FIELD OF THE INVENTION

The present invention relates generally to automatically changing the mechanical spool for a three-dimensional ("3-D") printer, and more specifically, to configurations of a filament guide and a filament pre-loaded tensioner element that enable the automatic changing of the mechanical spool.

BACKGROUND

3-D printing, or additive manufacturing, is a process of making three dimensional solid objects based on blueprints provided by digital files. The synthesis of the desired 3-D solid object is achieved by strategically generating successive layers of an additive material in a pattern on a platform of the 3-D printer until the entire object is created. The synthesis of the 3-D object is driven by digital files that provide specifications that describe how to create the pattern of layers and the materials used to generate the object. The digital files specifying the design are provided by the user, and the digital files read by the 3-D printer may include G-code files, computer-aided design ("CAD") files, STereo-Lithography ("STL") CAD files, or other file types generally used in additive manufacturing processes. In some instances, the digital files refer to a 3-D model of a new object, but alternatively, the digital files could refer to a copy of an object derived from the usage of a 3-D scanner.

The generation of the successive layers of the additive material can be performed, for example, according to one of: (1) Vat Photopolymerisation, (2) Material Jetting, (3) Binder Jetting, (4) Material Extrusion, (5) Powder Bed Fusion, (6) Sheet Lamination, or (7) Direction Energy Deposition. Specific processes used to generate the successive layers can involve making sequential deposits using fused deposition modeling ("FDM"), fused filament fabrication ("FFF"), or Direct Ink Writing ("DIW").

The materials used as the "ink" of the 3-D printer to generate the 3-D object can include, for example, any of: powder material, polymer material, thermoplastics, eutectic metals, edible materials, rubbers, modeling clay, plasticine, metal clay, ceramic materials, metal alloys, papers, composite materials composed of ceramics and metallic materials ("cermet"), metal matrix composites, ceramic matrix composites, photopolymers, plaster, stainless steel, aluminum, plastic film, and metal foil.

For some additive processes, the ink is referred to as a filament and the filament is held in cartridges that are referred to as spools. The filament is typically provided in long strands having a small diameter, and they are wrapped in the form of reels around the spools, which secure the filament in place before the filament is fed into the filament guide or a filament tube. After the filament is fed into the filament guide, the filament is pulled by an extruder into an extruder head. The process of feeding the filament into the filament guide is generally performed manually until a stepper motor of the extruder grips the filament and begins to pull the filament such that the filament unwinds from the spool. After the stepper motor of the extruder begins to pull the filament, the extruder head heats the filament to a temperature set by the 3-D printer, and the heated filament is released through a nozzle end of the extruder head. The heated filament is strategically released in successive layers in a pattern on the platform of the 3-D printer, which creates a solid object.

FIG. 1 illustrates a conventional device 100 for manually loading a filament into a 3-D printer. Shown in FIG. 1 are two separate spools 102 and 104. Spool 102 is an active spool because the filament 106 from the spool is being fed into a guide tube 110. Spool 104 is a new spool and it is inactive because the filament 108 is not being fed into the guide tube 110. The filament 106 has a length that is wrapped around the spool 102 and a diameter that is less than the diameter of the guide tube 110. In some conventional devices, the guide tube 110 does not protrude from the extruder 112 and instead is embedded in the extruder 112. Extruder 112 is the casing for the motor and hot-end components of the extruder 112. Within extruder 112, different configurations for a motor and hot end component are known including a direct drive extruder and a Bowden drive extruder. Conventional device 100 is configured as the direct drive extruder, but conventional device 100 could be modified to a Bowden drive extruder.

Within extruder 112, there is a stepper motor 114 and a gear 116 that interacts with a gear 118. When gear 116 is turned by the motor 114 in a clockwise direction, gear 116 interacts with gear 118 to rotate gear 118 in a counterclockwise direction. The portion of the guide tube 110 inserted into the extruder 112 is caught between a center rotating portion of gear 118 and a rotating bearing 120 such that the filament is pulled in a downwards direction. Beneath the motor is a hot end 122 of the extruder 112 that includes a heater 124 on a heating plate 128, a temperature measuring element 126 (e.g., a thermistor or a thermocouple), and an extruder head 130 protruding from the bottom of the extruder 112. The extruder head 130 has a nozzle with an extrusion width that emits the filament in molten form. There is no control of the second available filament 108 when the filament 106 is active. Moreover, the configuration requires a high level of user interaction when switching from the spool 102 to spool 104.

When a spool runs out of filament, the 3-D printer is generally operated according to a first conventional spool changing process so that a fresh spool having filament can replace an empty spool. FIG. 2 depicts a first conventional process 200 for manually changing a filament source during a build of a 3-D printer. At 202, the process begins. At 204, a user of the 3-D printer determines if the filament source is low or depleted. Based on 204, if the filament source is not low or depleted, the print continues and the process ends. If the filament source is low or depleted, the user of the 3-D printer stops the print process at 206. At optional 208, after the print has been stopped, the user unloads the old filament. In some 3-D printer configurations, the unloading involves heating the extruder to release excess hot filament and thereby depleting the remaining filament on the spool. In some other 3-D printer configurations, the unloading further involves cutting off an end of the filament still attached to the spool and depleting only the portion of the filament that remains in the guide tube. After 206 and/or 208, at 210, the user loads the new filament. To do so, the user threads a filament off of a new spool and into the guide tube of the extruder. At 212, the user interacts with the 3-D printer (if it is not already on) such that the stepper motor of the extruder pulls the threaded filament into the extruder head.

A second conventional spool changing process 300 for manually changing a filament source during a build of a 3-D printer is illustrated in FIG. 3. To avoid destruction of 3-D printed objects based on user inattention, process 300 integrates electronic sensors into the filament guide and/or extruder so that prints never end unexpectedly due to lack of filament. At 302, the process begins, and then at 304, a first electronic sensor of the 3-D printer communicates a signal to a processing device so the processing device can determine if the printer is running. If the printer is not running, the process ends at 316. At 306, if the printer is running, a second electronic sensor of the 3-D printer communicates a signal to the processing device so the processing device can determine if the filament is about to run out. If the filament is not about to run out, the process may optionally return to 302 to begin the process again and check the level of the filament are regular intervals. Alternatively, if the filament is not about to run out, the process ends at 316. If the processing device determines that the filament is about to run out, at 308, the processing device halts the print. At optional 310, the user manually unloads the old filament. At 312, after 308 and/or 310, the user loads a new spool of filament, and the user restarts the print at 314.

FIG. 4 is a conventional device 400 for manually loading a filament into a 3-D printer having electronic sensors on-board the extruder. FIG. 4 includes the same features as FIG. 1, but with the addition of processing device 436, and electronic sensors 432 and 434, which are communicatively coupled to processing device 436 so that the processing device 436 receives measurements relating to the print status and the filament status. Sensor 432, for example, can include a hall sensor or a similar element indicating when the motor 114 is active. Measurements from sensor 432 would be reviewed by the processing device 436 in order to make the determination associated with 304 in process 300. Sensor 434, for example, can include an optical sensor or a similar element indicating when the filament is no longer available at a particular point in the extruder 112. Measurements from sensor 434 would be reviewed by the processing device 436 in order to make the determination associated with 306 in process 300. Processing device 436 is further communicatively coupled to the motor 114 so that upon a determination in 308 from process 300 that the filament is about to run out, the print job is halted until the filament is reloaded.

SUMMARY

The first conventional process 200, described above, results in waste of materials and/or energy. In a large majority of 3-D printers, when the filament runs out, a print fails. Accordingly, users engaged in applications in which the accuracy of the 3-D object generated is of high importance do not want their objects to be printed during a period in which there is a transition from a first spool to a second spool. The manual transitions from the spools sometimes results in gaps between filament emissions or excess filament emissions from the extruder head. Some of the material released during an excess emission for purging purposes may come into contact with the 3-D object being printed and ruin or create an error in the print. To avoid such a manual transition, it is not uncommon that objects requiring a high level of accuracy are printed using only new spools of filament or spools of filament that have a large volume of filament remaining. Older spools having a small amount of filament are frequently discarded to avoid printing inaccuracies. In addition, the required involvement of the user to switch the filament requires user attention during a print, and some prints can take large periods of time. In addition, if no user is available when a filament change is needed, there can be additional delay until a user arrives to make the necessary spool/filament change. Requiring user involvement can substantially delay a print.

The second conventional spool changing process 300 does not correct many of the issues associated with the first conventional spool changing process. Although the user of the 3-D printer may be alerted to the low filament and the printing is stopped, the user still must manually load a new spool of filament and the result of the manual transition might still result in an inaccurate print. Moreover, adding electronic sensors, processing elements and memory elements increases the per unit cost of the 3-D printer. In addition to the physical components, each 3-D printing company must further invest in development costs associated with programming, testing, and loading software to manage the electronic sensor monitoring system.

Accordingly, embodiments of the present invention provide a spool changer that provides a mechanical, low-cost, solution that automatically loads a new filament into the guide tube without user involvement, in contrast to conventional systems that do not provide any automated filament loading process and merely provide solutions that halt the ongoing print job. In addition, the conventional spool changing systems require either high levels of user attention or expensive electronic sensors. The example embodiments of the present invention reduce costs by providing a mechanical solution that can complete the transition from one spool to the next without user involvement and/or electronic sensors.

The following is a summary of certain aspects of certain example embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

Within a 3-D printer casing and during a print, the extruder should have a constant supply of filament to accurately print a 3-D object. Accordingly, example embodiments of the present invention provide configurations of a device and system that feed a primary filament from a primary spool and that automatically switches from feeding the primary filament to feeding a refill filament from a refill spool without additional user interaction and without additional electronic sensors.

In an example embodiment, a device is configured to automatically load a refill filament for replacing a feed of a first filament into a 3-D printer extruder. The device includes a filament guide that includes a first input receiving the first filament, a refill input receiving the refill filament, and an output providing sequentially the first filament and then the refill filament to the extruder.

According to an example embodiment, a filament refilling system for automatically loading a refill filament for replacing a feed of a first filament into a 3-D printer extruder includes a preloading stage and a filament guide, where the preloading stage exerts a tension force on the refill filament, the filament guide receives the first filament and the refill filament having the tension force, and the filament guide further provides, sequentially, to the extruder, the first filament and then the refill filament.

According to an example embodiment a method for automatically loading a refill filament for a first filament into a 3-D printer extruder. includes pulling, by the extruder, the first filament; when the end of the first filament is pulled past a predetermined location in a filament guide, automatically threading, by the preload element, the refill filament towards the predetermined location; pushing, by the preload element, the refill filament towards the extruder until the refill filament extends into the extruder; and, after the extruder catches the refill filament, pulling, by the extruder, the refill filament.

Although to some extent example embodiments of the present invention may be described independently, combinations of the example embodiments are understood to be referred to herein. As such, any combination of features relating to the filament guide and a filament pre-loader of any variety described within the present invention are stipulated to herein. In addition, and conversely, it should be understood that although a feature may be described in the context of a combination with other features, the different features are separable and do not necessarily require or rely on one another for a functional or useful embodiment of the present invention.

These aspects described in the foregoing are presented merely to provide a brief summary of these example embodiments, and these aspects are not intended to limit the scope of this disclosure. Indeed, the present invention may also encompass a variety of other aspects. These and other features, aspects, and advantages of the present invention are further clarified by the following detailed description of certain exemplary embodiments in view of the accompanying drawings throughout which like characters represent like parts.

DETAILED DESCRIPTION

One or more specific example embodiments will be described below. In an effort to provide a concise description of these embodiments, not all features of an actual implementation are necessarily described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such development efforts might be complex and time consuming, but would nevertheless be a routine undertaking of design, fabrication, and manufacture for those of ordinary skill having the benefit of this disclosure.

Figure 1:
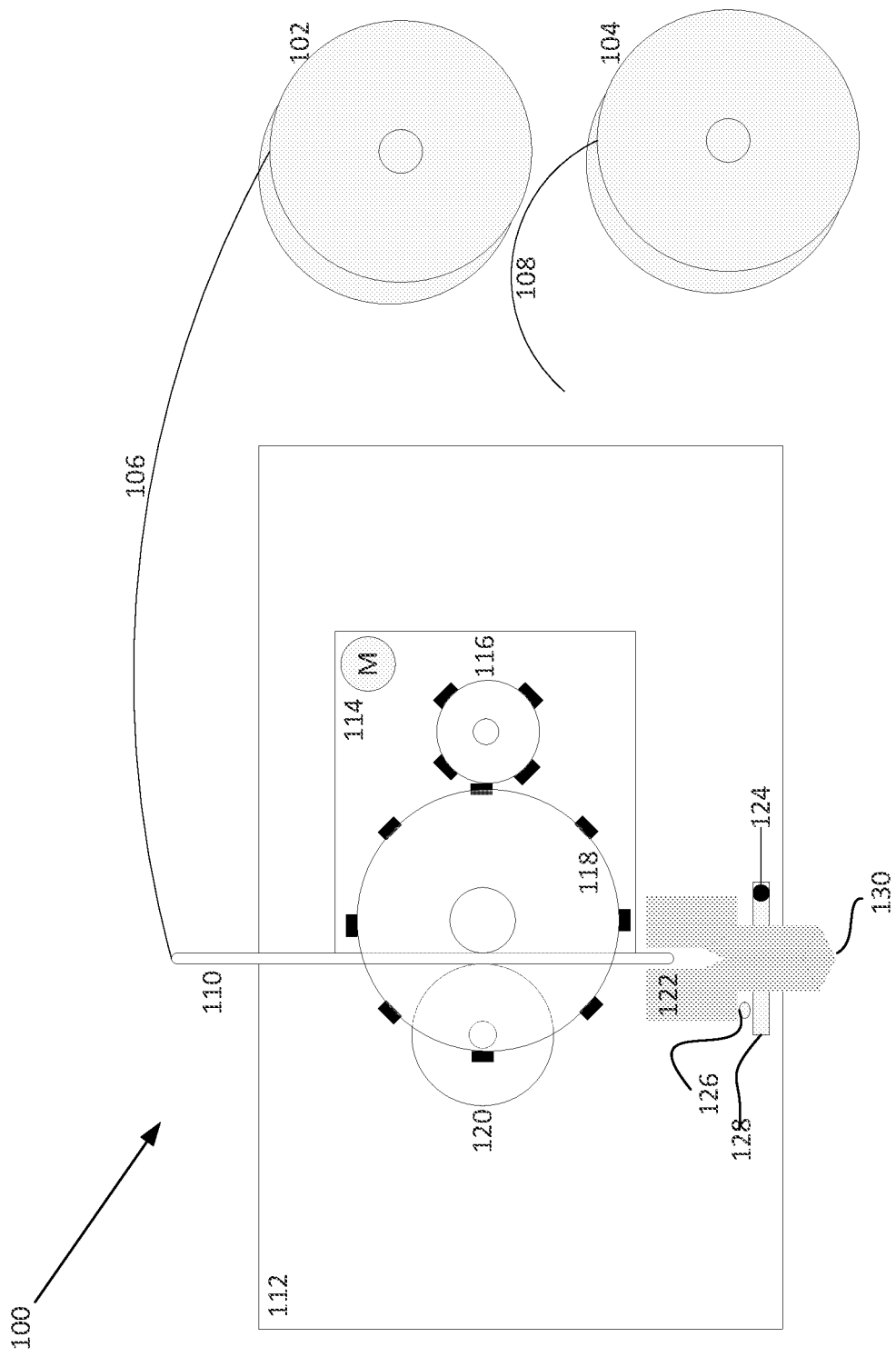
FIG. 1 illustrates a conventional device for manually loading a filament into a 3-D printer.
Figure 2:
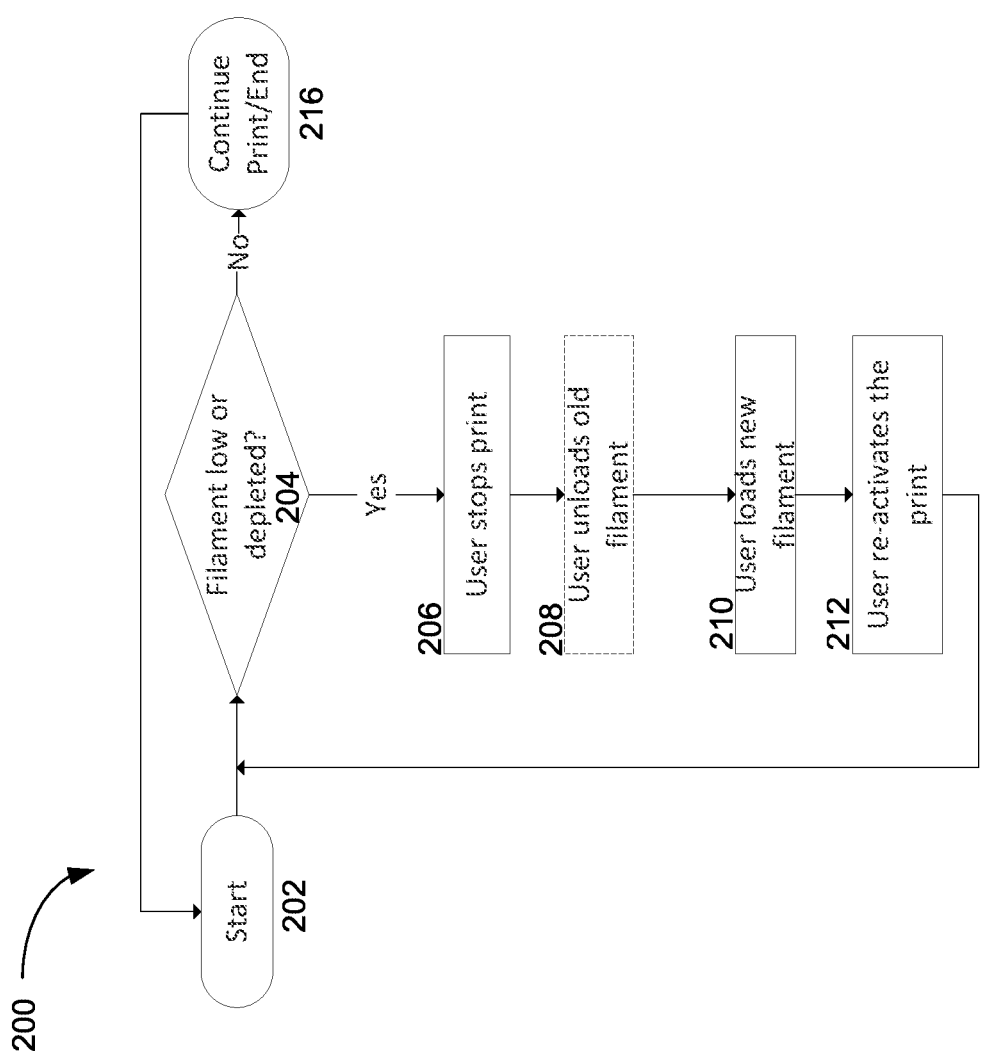
FIG. 2 illustrates a conventional process for manually changing a filament source during a print by a 3-D printer.
Figure 3:
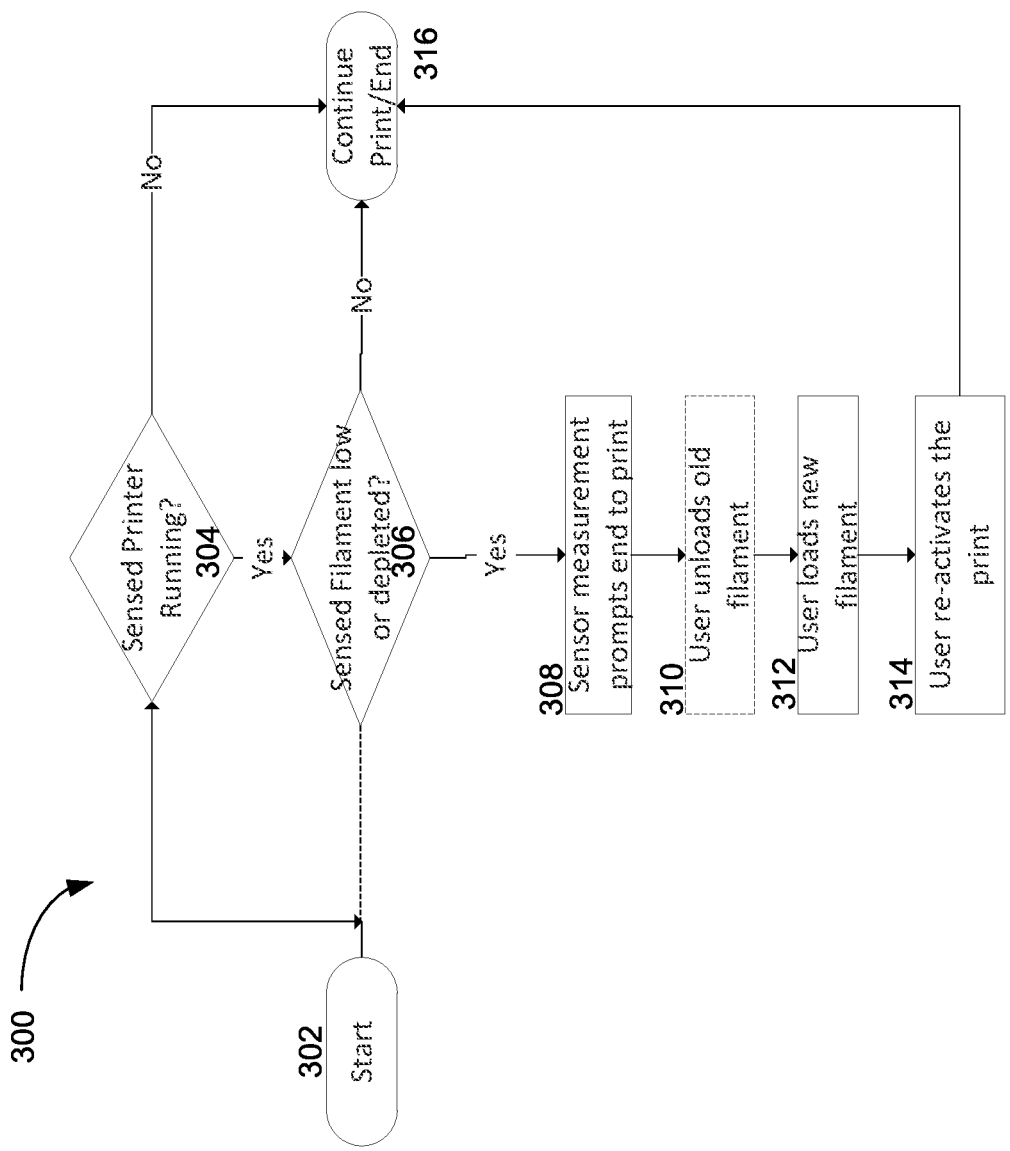
FIG. 3 illustrates another conventional process for manually changing a filament source during a print by a 3-D printer.
Figure 4:
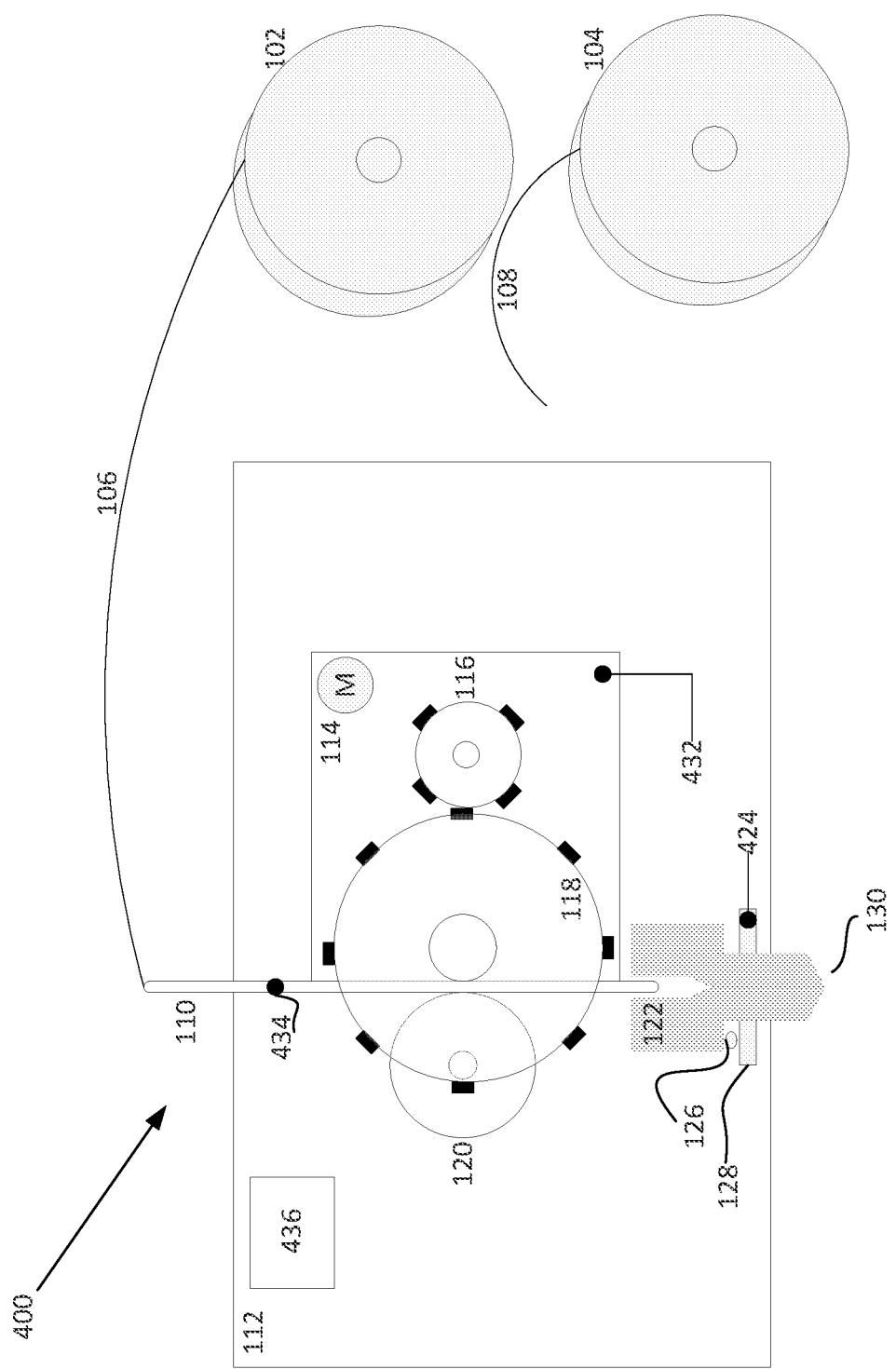
FIG. 4 illustrates a conventional 3-D printer device including electronic sensors on-board the extruder.
Figure 5:
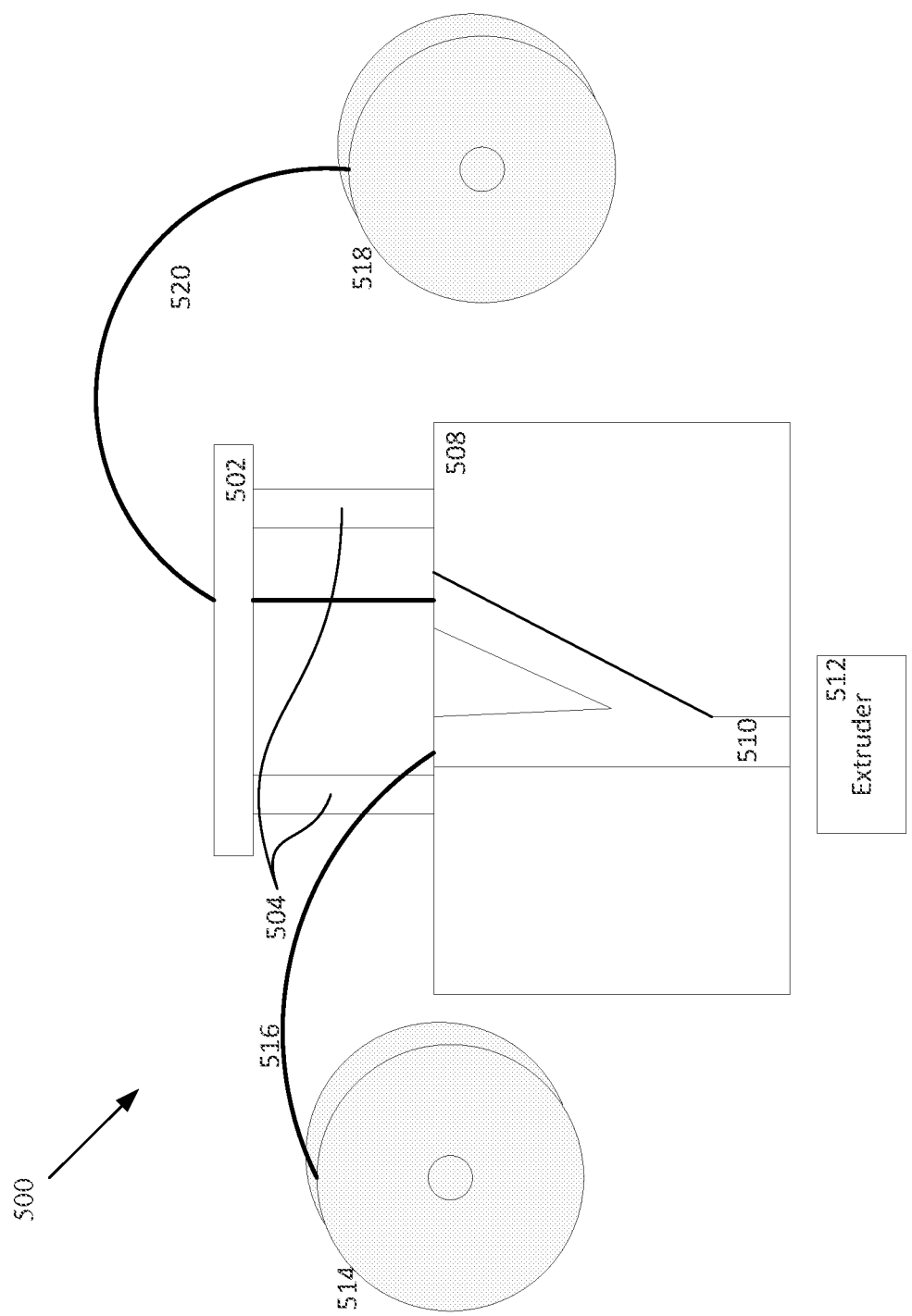
FIG. 5 illustrates a mechanical automated spool changing system including a filament guide and a filament pre-loader, according to an example embodiment of the present invention.

FIG. 5 illustrates a mechanical automated spool changing system 500 including a filament guide 508 and a filament pre-loader 502, according to an example embodiment. Pre-loader 502 is shown to be connected to the filament guide 508 by a support mechanism 504 shown as including two support leg structures. The at least one support mechanism 504 includes in some embodiments one or no support leg structures. In other example embodiments, the at least one support mechanism 504 is in the form of a rotatable arm. Alternatively, the support mechanism 504 can enable maintaining a predefined distance between the filament guide 508 and the pre-loader 502 without forming a direct physical connection between them, for example by suspending the pre-loader 502 in a predefined location relative to the filament guide 508.

In the example embodiment, as shown in the mechanical automated spool changing system 500, a primary spool 514 loaded with a primary filament 516 feeds the primary filament 516 directly into the filament guide 508, without the filament 516 being threaded through the pre-loader 502. In particular, the filament 516 is fed into a first one of guide holes that is provided at the top of the filament guide 508 and that forms a first entrance into a hollow portion 510 within the filament guide 508. The mechanical automated spool changing system 500 further includes a secondary spool 518 loaded with a secondary filament 520. The pre-loader 502 receives the secondary filament 520 and provides tensioning such that the filament 520 is pushed, and remains in a loaded state within the hollow portion 510 of the filament guide 508. In some example embodiments, the pre-loader 502 itself tensions the filament 520. In other example embodiments, the support mechanism 504 itself or the support mechanism 504 in combination with the pre-loader 502 tensions the filament 520. In particular, the filament 520 is fed into a second one of the guide holes that is provided at the top of the filament guide 508 and that forms a second entrance into the hollow portions 510 within the filament guide 508. The output from the filament guide 508 is provided from the output of the hollow portions 510 to the extruder 512 for heating and application to a build platform of the 3-D printer.

Figure 6:
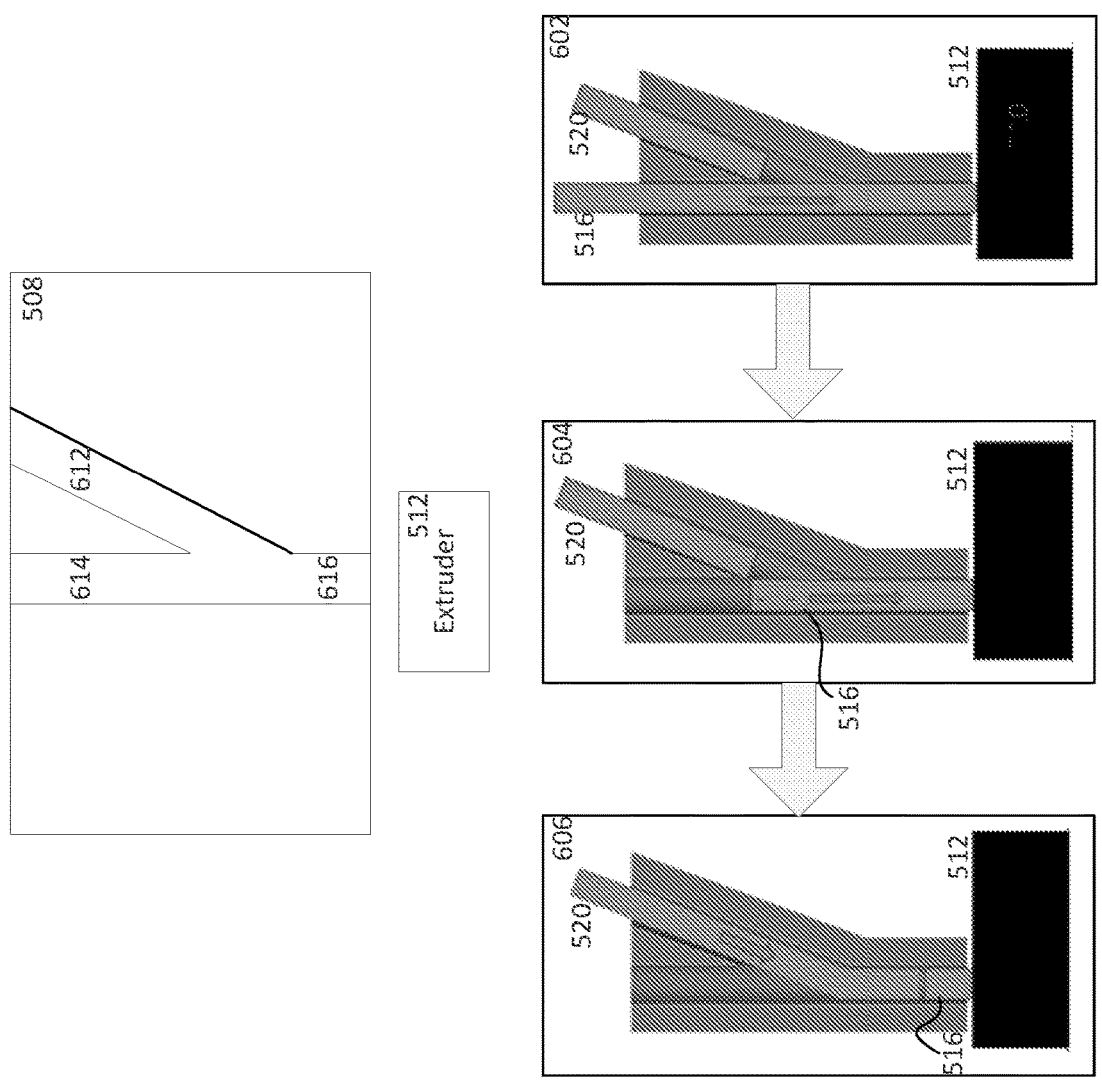
FIG. 6 illustrates a filament guide included in a mechanical automated spool changing system, according to an example embodiment of the present invention.

FIG. 6 illustrates details concerning the filament guide 508 included in the mechanical automated spool changing system. Within the filament guide structure 508, the hollow portions 510 are in the form of a Y-shaped structure. The Y-shaped structure includes two input regions, including primary hollow portion 614 and secondary hollow portion 612. The Y-shaped structure includes one output region referred to as the shared hollow portion 616. Although a Y-shaped structure is used in the illustrated example embodiment, other shapes and variations of the Y-shaped structure can be used based on the flexibility of the filament deployed within the filament guide 508 and the ability of the pre-loader 502 to provide a tensioned force on the secondary filament 520. During use of the filament guide 508, the primary filament 516 from the primary spool 514 is generally first loaded into the primary hollow portion 614 and threaded through the shared hollow portion 616. In some example embodiments, the primary filament 516 is also threaded into the extruder 512 so that the motor of the extruder 512 catches the filament 516 and begins to pull the filament 516 through the extruder 512. After the primary filament 516 has been loaded, the secondary filament 5120 from secondary spool 518 is loaded into the secondary hollow portion 612. The position of the primary filament 516 in the primary portion 614 blocks the secondary filament 520 at the junction of the Y-shape, causing the secondary filament 520 to remain within the secondary hollow portion 612 of the Y-shaped structure of the filament guide 508.

The bottom portion of FIG. 6 illustrates different stages of loading the filament guide 508 are depicted. In a first stage depicted at 602, the filament guide 508 has received and loaded into the extruder 512 a primary filament 516. The filament guide 508 has further received a tensioned, or loaded, secondary filament 520. While the primary filament 516 continues to load into the extruder 512 and remains above the junction in the Y-shaped structure, the secondary filament 520 remains in the secondary hollow portion 612 of the filament guide 508. The primary filament 516 is continuously fed into the extruder 512 until it runs out.

In a second stage depicted at 604, the filament guide 512 contains the primary filament 516 and the secondary filament 520 during a transition to the secondary spool 518. When the end of the primary filament 516 passes the front end of the secondary filament 520 at the junction in the Y-shaped structure, the load exerted on the secondary filament 520 begins to push the secondary filament 520 through the junction immediately following the back end of the primary filament 516. The primary filament 516 that remains from the primary spool 514 is fed into the extruder 512, and as the extruder 512 pulls the primary filament 516, the blockage at the junction of the Y-shape is removed allowing the loaded secondary filament 520 to follow.

In a third stage depicture at 606, the filament guide 508 contains a small portion of the primary filament 516 that remains from the primary spool 514. Directly above the back end of the primary filament 516 is the front end of the secondary filament 520. Due to the load continuously exerted on the secondary filament 520, the secondary filament 520 follows the primary filament 516 into the shared hollow portion 616 of the filament guide 508. Secondary filament 520 is loaded, after the primary filament 516, into the extruder 512 via the secondary hollow portion 612 and the shared hollow portion 616.

Figure 7:
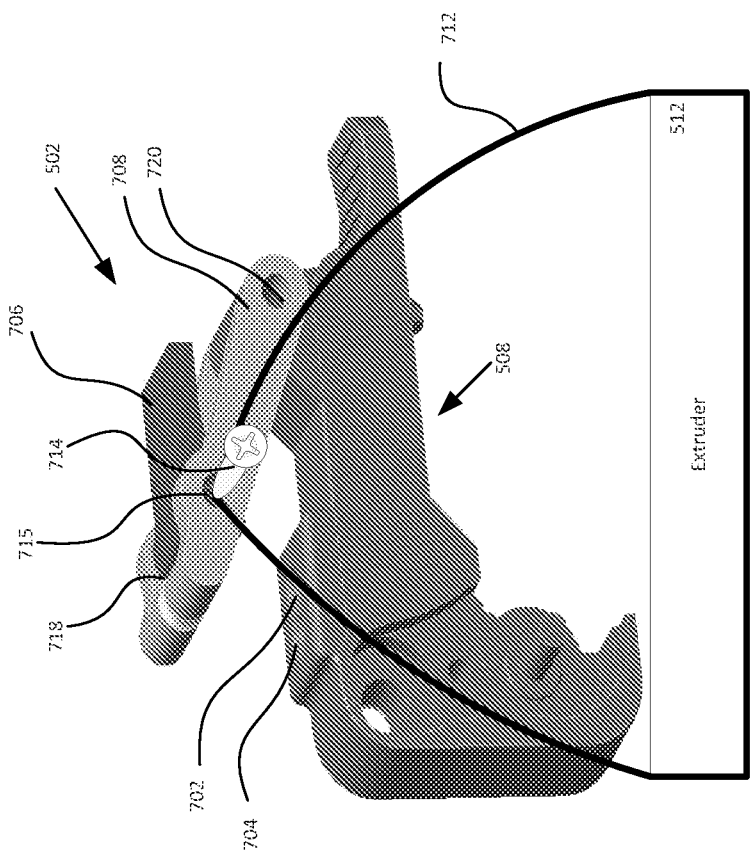
FIG. 7 is a perspective view of a cam tab filament pre-loader included in a mechanical automated spool changing system, according to an example embodiment of the present invention.

FIG. 7 is a perspective view of a cam tab filament pre-loader 502 and the filament guide 508 included in a mechanical automated spool changing system according to an example embodiment. FIG. 7 also includes a representation of the extruder 716 and example connections between these elements. The illustrated filament guide 508 includes a first bore 702 configured for threading therethrough the secondary filament 520 from the secondary spool 518. The first bore 702 is shown to be located proximal to a supporting arm 708 of the pre-loader 502. The illustrated filament guide 508 further includes a second bore 704 configured for threading therethrough the primary filament 516 from the primary spool 514. The second bore 704 is shown to be located distal to the supporting arm 708 of the pre-loader 502.

In an example embodiment, the pre-loader 502 includes a cam tab 706, a threading hole 718, the supporting arm 708, a screw 714, and a tensioning element 712. The cam tab 706 is coupled to the supporting arm 708 and includes a protruding portion and an embedded portion, the embedded portion being embedded in the supporting arm 708 and being rotatable relative to the supporting arm 708 about a central longitudinal axis of the screw 714. For example, in an example embodiment, the embedded portion of the cam tab 706 includes protruding tabs 715 that rotate within bores in the supporting arm 708. (In an example embodiment, the screw 714 can be eliminated and one of the protruding tabs 715, for example, instead extends out of the bores so that the tensioning element can wrap around the protruding tab 715.) Screw 714 is depicted as exploded from its connection point in the supporting arm 708. The threading hole 718 extends through the supporting arm 708 from an upper side of the supporting arm 708 to a lower side of the supporting arm 708, the threading hole being positioned between a first end of the supporting arm 708 and the rotatable end of the embedded portion of the cam tab 706.

In an example embodiment, at a second end of the supporting arm 708, opposite the first end, the supporting arm 708 is coupled to the guide 508 in a manner by which the supporting arm 708 is rotatable relative to the guide 508. For example, in an example embodiment, the supporting arm 708 is rotatable about a fixed hinge or rotation bar 720. The rotation allows for the first end of the supporting arm 708 to be rotated towards and away from the filament guide 508.

The secondary filament 520 is threaded through the threading hole 718 and into the first bore 702. The pre-loader 502 uses the combination of the cam tab 706, the supporting arm 708, and the tensioning element 712 to apply tension to the secondary filament 520 in the first bore 702 before the primary filament 516 is depleted. The tension applied to the secondary filament 520 is such that it cannot overcome the blockage force provided by the threaded primary filament 516 but is sufficient to move the secondary filament 520 through the shared portion 616 of the guide 508 when the blockage from the primary filament 516 is removed.

A first end of the tensioning element 712 is secured to the supporting arm 708, for example, by the screw 714. In an example embodiment, the tensioning element 712 is also secured to the rotation bar 720. In an example embodiment, the tensioning element 712 is a rubber band, e.g., wrapped over the screw 714, and in an example embodiment also wrapped over the rotation bar 720. In another example embodiment, the tensioning element 712 is a flexible material with elasticity properties similar to those of a rubber band. A second end of the tensioning element 712 is secured around the body of the extruder 512. In an example embodiment, another screw and tensioning element are provided on a second, opposite side of the supporting arm 708. When the secondary filament 520 is threaded through the threading hole 718, the cam tab 706 exerts a gripping force on that portion of the secondary filament 520 that is within the supporting arm 708. The gripped secondary filament 520 is provided a constant tensioning force based on the connection of supporting arm 708 to the tensioning element 712, which is itself connected to and around the extruder 512. In an example embodiment, the tensioning element 712 is secured to elements, other than the extruder 512, that are stationary relative to the extruder 512 and are below the supporting arm 708, thereby applying a downward force to the supporting arm 708.

When the blockage in the guide 508 at the Y-junction by the primary filament 516 is removed, the tension from the tensioning element 712 is translated to movement of the secondary filament 520 by way of the supporting arm 708, which is pulled downwards towards the extruder 512 under force of the tensioning element 712, the secondary filament 520 thereby being pushed through the first bore 702. As the secondary filament 520 is pushed, it remains locked into place within the threading hole 718 in the supporting arm 708 due to the gripping force applied by the cam tab 706. When the tension force causes the movement of the secondary filament 520, the tension force is translated into a torque. The amount of torque provided is equal to the downward force exerted by the tensioning element 712 multiplied by the distance between the rotation bar 720 of the supporting arm 708 and the location at which the tensioning force is exerted, e.g., the screw 714 according to the illustrated embodiment.

Due to the torque and based on the rotation of the supporting arm 708 about the rotation bar 720, the end of the supporting arm 708 near the screw 714 lowers towards the surface of the filament guide structure 508 until the bottom surface of the supporting arm 708 is flush against, or stopped by, the filament guide structure 508, e.g., by a face of the filament guide structure 508 that includes the first and second bores 702 and 704. Because the secondary filament 520 is initially locked to the arm 708, the downward motion of the arm 708 causes a downward motion of the secondary filament 520. By the time the arm 708 reaches the top surface of the filament guide structure 508, the secondary filament 520 has been lowered enough so that it reaches an element in the filament guide structure 508 or in the extruder 512 that tugs on the secondary filament 520. The tugging causes enough of a downward force to be applied directly to the filament 520, so that it causes a rotational force on the cam tab 706 since the arm 708 can no longer move downward, causing the cam tab 706 to flip up and release the filament 520, allowing the filament 520 to thereafter be freely fed into and through the threading hole 718 towards the extruder 512. That is, continued tugging on the secondary filament 520, causing it to move downward while the supporting arm 708 is blocked from further downward movement causes the cam tab 706 to rotate, thereby releasing the gripping force of the cam tab 706 on the secondary filament 520. The rotation of the cam tab 706 is such that the protruding portion of the cam tab 706 flips upwards. The release of the secondary filament 520 from the gripping of the cam tab 706 allows a continued feed of the secondary filament 520 from the spool 518 and into the threading hole 718 and then the filament guide structure 508.

Figure 8:
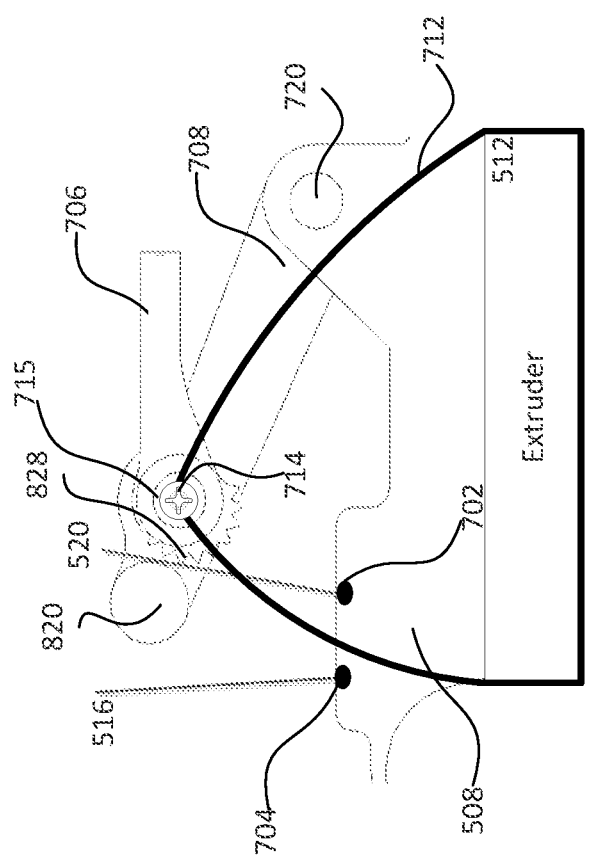
FIG. 8 is a side cutaway view of the cam tab filament pre-loader included in a mechanical automated spool changing system, according to an example embodiment of the present invention.

FIG. 8 is a side cutaway view of the cam tab 706 included in a mechanical automated spool changing system, according to an example embodiment of the present invention. The primary and secondary filaments 516 and 520 are shown threaded through, respectively, the second and first bores 704 and 702. Secondary filament 520 is illustrated as locked by a gripping force between a portion 820 of the supporting arm 708 and a rotatable end of the embedded portion of the cam tab 706. In an example embodiment, the rotatable end of the embedded portion of the cam tab 706 includes teeth 828. In some example embodiments, the rotatable end of the embedded portion of the cam tab 706 is oval shaped so that in a first position where the long extension of the oval is directed towards the portion 820 of the supporting arm 708, the secondary filament 520 is held tightly between the portion 820 of the supporting arm 708 and the cam tab 706, but in a second position where the short extension of the oval is directed towards the portion 820 of the supporting arm 708, the secondary filament 520 moves freely between the cam tab 706 and the portion 820 of the supporting arm 708. In an example embodiment, the portion 820 of the supporting arm 708 on one side of the threading hole 718 is stationary. In another example embodiment, the portion 820 of the supporting arm on one side of the threading hole 718 is a rotatable bearing.

As explained above, the tensioning element 712 is configured to apply a downward force to the supporting arm 708, and therefore to the secondary filament 520 before the primary filament 516 is depleted, but such that the generated force is insufficient to overcome the blockage force provided by the threaded primary filament 516, but so that the tension is sufficient to move the secondary filament through the shared portion of the hollow portion 510 when the blockage from the primary filament 516 is removed.

Figure 9:
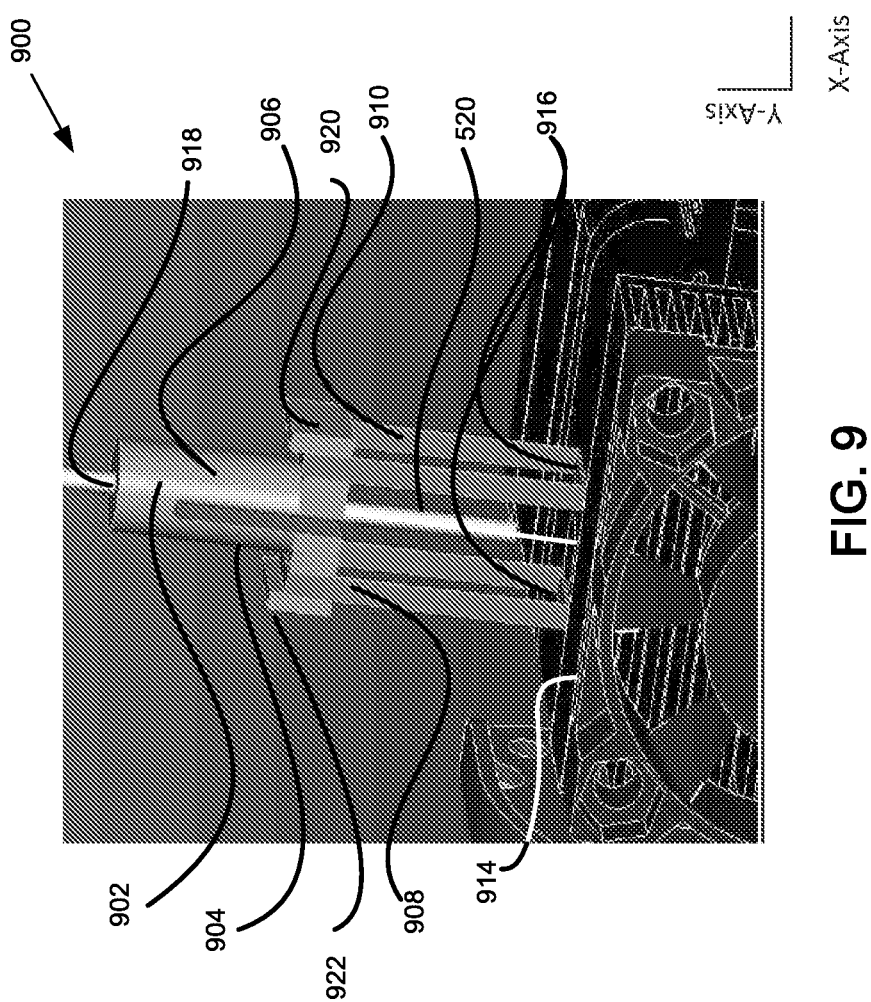
FIG. 9 is a perspective view of a rubber band filament pre-loader included in a mechanical automated spool changing system, according to an example embodiment of the present invention.

FIG. 9 is a perspective view of a rubber band filament pre-loader 900 included in a mechanical automated spool changing system, according to an alternative example embodiment. The figure also shows the top of a casing 914 that includes the filament guide structure 508. While the first filament 516 blocks the secondary filament 520 from extending into the shared hollow portion 616, the body 902 of the pre-loader 900 is positioned at a distance, along the y-axis, above the top of the casing 914. The distance above the top of the casing 914 is determinable based on the elasticity properties of the tensioning elements used in conjunction with the pre-loader body 900 and the extent to which the tensioning elements are stretched.

In an example embodiment, the pre-loader 900 includes the pre-loader body 902. The pre-loader body 902 includes a first section 906 and a second section 904. The pre-loader 900 further includes tensioning elements 908 and 910 and connecting elements 916. The pre-loader body 902 includes a threading hole 918 for receiving the secondary filament 520. Each of the first section 906 and second section 904 includes a respective receiving attachment 920/922. Each of the receiving attachments 920 and 922 is configured to interact with and hold a respective first end of a respective tensioning element 910/908. Respective ones of the connecting elements 916 are configured to hold second ends of respective ones of the tensioning elements 908 and 910 to the surface of casing 914. In an example embodiment, connecting elements 916 are positioned inside the casing 914, for example, with cut-outs being provided on the surface of casing 914 to account for the placement of the connecting elements 916 and their connection to the tensioning elements 908 and 910.

Secondary filament 520 is illustrated as locked in place relative to the casing 914 by the blocking by the primary filament 516, and also locked in place relative to the pre-loader body 902 by a gripping force exerted on the secondary filament 520 by two countervailing inward forces exerted by the first and second sections 904 and 906 of the pre-loader body 902 towards each other, which is towards a y-axis. The tensioning elements 908 and 910 apply a downward force onto the pre-loader body 902 and therefore to the secondary filament 520. The force is generated such that it cannot overcome the blockage force provided by the threaded primary filament 516 but such that it is sufficient to move the secondary filament 520 through the shared hollow portion 616 of the hollow portion 510 when the blockage from the primary filament 516 is removed. Additionally, the tensioning force is not so great as to overcome the force exerted by the first and second sections 904 and 906 of the pre-loader body 902, so that the pre-loader body 902 does not slide down relative to the secondary filament 520.

In an example embodiment, the tensioning elements 908 and 910 are each a rubber band. In another example embodiment, the tensioning elements 908 and 910 are of a flexible material having elasticity properties similar to a rubber band. In an example embodiment, the tensioning elements 908 and 910 are secured to elements, other than the connecting elements 916 on casing 914, that are stationary relative to the filament guide structure 508.

When the blockage at the Y-junction in the guide structure 508 by the primary filament 516 is removed, the tension from the tensioning elements 908 and 910 is translated to movement of pre-loader body 902 and therefore the secondary filament 520. As the secondary filament 520 is pushed, it remains locked into place within the threading hole 918 in and relative to the pre-loader body 902 due to the gripping force applied by the first section 906 and the second section 904. When the tension force is exerted towards the surface of the casing 914, both of the secondary filament 520 and the pre-loader body 902 move together towards the casing 914 until the bottom surface of the pre-loader body 902 is flush against, or stopped by, the top face of the casing 914. The continued force acting directly on the secondary filament 520 is sufficient to overcome the gripping force exerted by first section 904 and the second section 908 on the secondary filament 520, so that the pre-loader body 902 remains seated on the top of the casing 914 while the secondary filament 520 continues to move through the threading hole 918 and into the filament guide structure 508. This is because, when the bottom surface of the pre-loader body 902 is flush against, or stopped by, the top face of the casing 914, the pre-loader body 902 no longer moves downwards under the force exerted by the tensioning elements 908 and 910 but a front end of the filament 520 has already been loaded to such an extent that the motor of the extruder 512 begins to pull the secondary filament 520 into the casing 914. The pull of the secondary filament 520 by the motor is with a force that exceeds the gripping force exerted by the first section 904 and the second section 908 on the secondary filament 520, so that the secondary filament 520 moves within the threading hole 918 and relative to the pre-loader body 902 while the pre-loader body 902 remains seated on the top of the casing 914.

Figure 10:
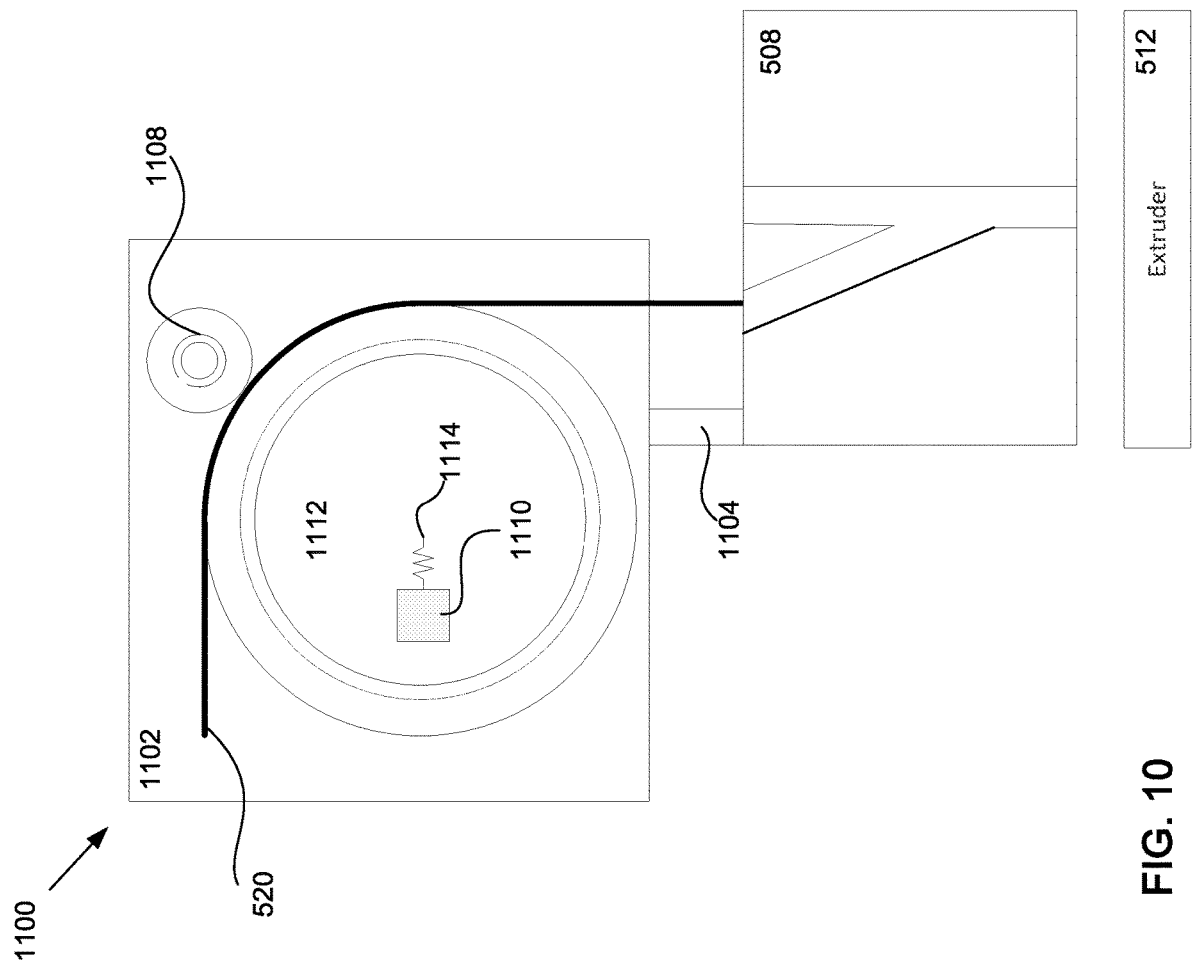
FIG. 10 is a view of a tensioner wheel filament pre-loader included in a mechanical automated spool changing system, according to an example embodiment of the present invention.

FIG. 10 is a perspective view of a tensioner wheel filament pre-loader 1100 included in a mechanical automated spool changing system, according to an alternative example embodiment of the present invention. FIG. 10 also shows the filament guide structure 508 as well as the extruder 512. The secondary hollow portion 612 for the secondary filament 520 is located proximal to the pre-loader casing 1102. The primary hollow portion 614 for the primary filament 516 is located distal to the pre-loader casing 1102. The pre-loader casing 1102 is connected to the filament guide structure 508 by a connecting element 1104, e.g., a support post. Additional support posts or connecting elements can be provided as necessary based on the weight of the elements included in the pre-loader casing 1102.

Pre-loader casing 1102 includes a guide roller 1108 and a tensioner wheel 1112 between which the secondary filament 520 is fed. The pre-loader 1100 uses the combination of the guide roller 1108 and the tensioner wheel 1112 to apply a force to the secondary filament 520 towards the filament guide structure 508, such that it cannot overcome the blockage force provided by the threaded primary filament 516 but that is sufficient to move the secondary filament 520 through the shared hollow portion 616 when the blockage from the primary filament 516 is removed.

Tension is generated by a torsion spring 1114 attached to the tensioner wheel 1112. The force generated by the torsion spring 1114 is impacted, for example, by a load 1110, which force impacts the amount of tension generated by physical rotational motion of the tensioner wheel 1112 on the secondary filament 520. When the torsion spring 1114 is loaded, the tensioner wheel 1112 exerts a force tending to push the secondary filament 520 into the guide structure 508. The torsion spring 1114 is loaded, for example, by winding the torsion spring 1114 in a direction counter to the movement that the tensioner wheel 1112 exerts on the secondary filament 520. When the blockage force provided by the threaded primary filament 516 in the guide structure 508 remains in place, the load of the torsion spring 1112 remains at an initial pre-loaded level. Once the blockage force provided by the threaded primary filament 516 in the guide structure 508 is removed, the tension generated by the load of the torsion spring 112 is released and translated into rotational movement of the tensioner wheel 1112, which, combined with the free-spinning guide roller 1108 pushes the secondary filament 520 through the guide structure 508. The spring 1114 is loaded with enough energy such that, once released, the tensioner wheel 1112 is rotated a sufficient amount by which to lead the secondary filament 520 to the extruder 512, which then subsequently pulls on the filament 520.

Although the pre-loader casing 1102 is illustrated herein, alternative embodiments can be implemented in which supporting arms for elements 1108 and 1112 are directly connected to the filament guide structure 508 and pre-loader casing 1102 is not utilized.

Figure 11:
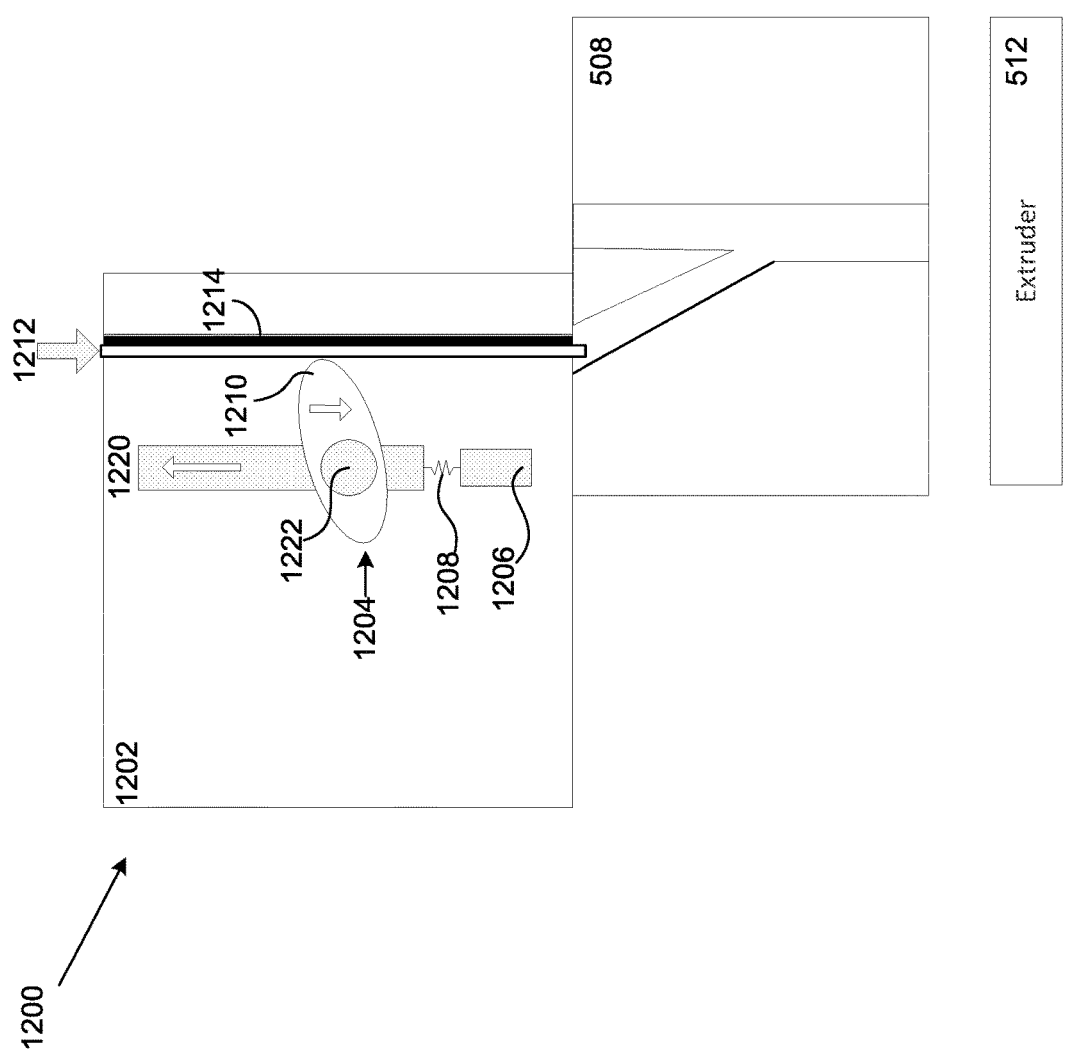
FIG. 11 is a view of a linear tensioner guide filament pre-loader included in a mechanical automated spool changing system, according to an example embodiment of the present invention.

FIG. 11 provides a perspective view of a linear tensioner guide filament pre-loader 1200 included in a mechanical automated spool changing system, and also shows the filament guide structure 508 and extruder 512. The secondary hollow portion 612 for the secondary filament 520 is located proximal to the pre-loader casing 1202. The primary hollow portion 614 for the primary filament 516 is located distal to the pre-loader casing 1202. The pre-loader casing 1202 is depicted as being directly connected to the filament guide structure 508. In an alternative example embodiment, at least one separate connecting element connects the pre-loader casing 1202 and the filament guide structure 508. Additional support posts or connecting elements can be provided as necessary based on the weight of the elements included in the pre-loader casing 1202.

The secondary filament 520 from the secondary spool 518 is provided in direction 1212 into the pre-loader casing 1202 and is guided, for example, along wall 1214. The pre-loader 1200 uses the combination of a support arm 1220, a cam 1204, and a spring 1208 to apply a downward force to the secondary filament 520. The force applied to the secondary filament 520 is generated such that it cannot overcome the blockage force provided by the threaded primary filament 516, but so that the tension is sufficient to move the secondary filament 520 through the shared hollow portion 616 when the blockage from the primary filament 516 is removed. Cam 1204 is depicted herein as an off-center circle or oval component. In an example embodiment, cam 1204 instead includes teeth as illustrated in FIG. 8.

In an example embodiment, the pre-loader 1200 includes a pre-loader casing 1202. (Although the pre-loader casing 1202 is illustrated herein, additional embodiments in which the supporting arms for elements 1220 and 1214 are directly connected to the filament guide structure 508, and in which pre-loader casing 1202 is not utilized, can be implemented.) Pre-loader casing 1202 includes a support arm 1220, cam 1204, and spring 1208. Support arm 1220 is connected to the cam 1204 by a pin 1222. The pin connection 1222 allows cam 1204 to have rotatable, or pivotable, end 1210. Spring 1208 is preloaded by load 1206 and is, for example, compressed while pushing against the support arm 1220, the elastic properties of the spring 1208 exerting a force to achieve a relatively more expanded state. When the blocking by the primary filament 516 is removed, the spring 1208 pushes the support arm 1220 upwards. The cam 1204 responsively rotates about the pin 1222. Due to engagement of the end 1210 of the cam 1204 with the secondary filament 520, the rotational movement of the cam 1204 is translated into a linear motion of the secondary filament 520 in direction 1212 towards the filament guide structure 508.

Figure 12:
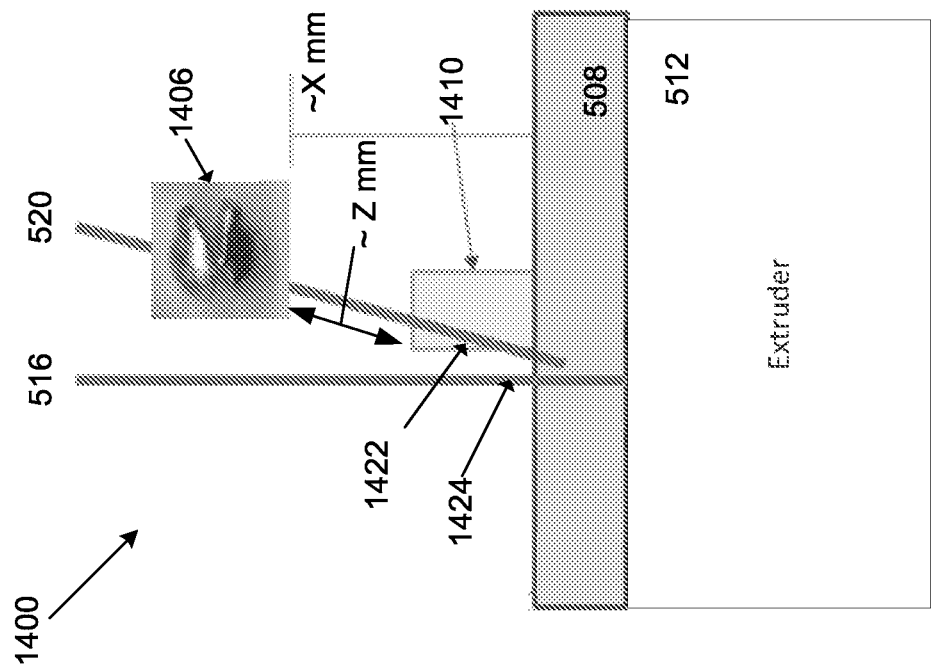
FIG. 12 is a view of a wedge line clamp filament pre-loader included in a mechanical automated spool changing system, according to an example embodiment of the present invention.

FIG. 12 provides a perspective view of a wedge line clamp filament pre-loader 1400 included in a mechanical automated spool changing system, and also shows the filament guide structure 508 and the extruder 512. The arrangement includes a guide 1422 for the secondary filament 520, which is located proximal to a mass removal block 1410, and a guide 1424 for the primary filament 516, which is located distal to the mass removal block 1410. The pre-loader elements are depicted without a casing, but, in an example embodiment, a casing is provided surrounding elements 1406 and 1410. In an embodiment having a casing for the pre-loader, a panel of the casing is removable to allow for user interaction with elements 1406 and 1410.

The mass removal block 1410 is connected to or near the filament guide structure 508. In an example embodiment, the casing of the pre-loader is directly connected to the filament guide structure 508. In an example embodiment, at least one separate connecting element connects the pre-loader casing to the filament guide structure 508. Additional connecting elements providing support for the filaments and the mass removal block can be provided as necessary.

The secondary filament 520 from the secondary spool 518 is provided so that one end is threaded into the guide 1422 for the secondary filament 520. The primary filament 516 from the primary spool 514 is provided so that one end is threaded into the guide 1424 for the primary filament 516.

A mass 1406 applies a downward force to the secondary filament 520 in the guide 1422, the force being insufficient to overcome the blockage force provided by the threaded primary filament 516 but being sufficient to move the secondary filament 520 through the shared hollow portion 616 when the blockage from the primary filament 516 is removed. In an example embodiment, the mass 1406 is crimped to the secondary filament 520. Any other suitably appropriate mechanism for attachment can be used instead.

In pre-loader 1400, the filament 520 is directly preloaded by the weight of mass 1406. The mass 1406 is connected to a particular portion of the filament that is located X mm above the face of the filament guide structure 508. For example, in an example embodiment, the mass 1406 is connected to the filament 520 10 mm above the face of the filament guide structure 508. When the secondary filament 520 is loaded by the mass 1406, the mass 1406 exerts a force urging the secondary filament 520 further into the guide structure 508. The threaded primary filament 516, however, blocks the secondary filament 520 from moving under that force. Once the blockage force provided by the threaded primary filament 516 in the guide structure 508 is depleted at the Y-junction, the force generated by the mass 1406 moves the secondary filament 520 downward relative to the mass removal block 1410 and through the guide structure 508.

Initially, as the secondary filament 520 moves downwards, the mass 1406 remains on the initial portion of the secondary filament at which the mass was originally attached, e.g., crimped, to the secondary filament 520. The downward motion of the mass 1406 attached to the secondary filament 520 continues without interruption while the mass 1406 travels a Z mm distance. After traveling the Z distance, the portion of the secondary filament 520 to which the mass 1406 is attached reaches the mass removal block 1410, and with continued movement of the secondary filament 520, the mass removal block 1410 pulls the mass 1406, detaching the mass 1406 from the secondary filament 520. However, at this stage, the extruder 512 tugs on the filament 520 for a continued feed of the filament 520. In an example embodiment, during the time at which the mass 1406 is removed from the secondary filament 520, the motor of the extruder 512 begins to pull the secondary filament 520, and, as the secondary filament 520 continues to move downwards through the filament guide structure 508 and into the extruder 512, the mass 1406 remains engaged in the mass removal block 1410. In another example embodiment, the motor of the extruder 512 begins to the pull the secondary filament 520 before the removal of the mass 1406. In an example embodiment, the height of the mass removal block 1410 is selected to allow for Z to be at least as long as necessary for the filament 520 to reach a point at which it is engaged by the extruder 512 prior to the removal of the mass 1406 from the filament 520.

Figure 13:
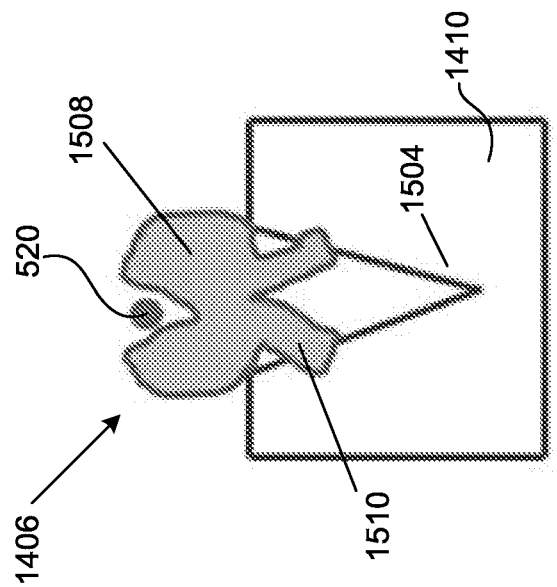
FIG. 13 is a side view of the wedge line clamp filament pre-loader caught on a mass removal block included in a mechanical automated spool changing system, according to an example embodiment of the present invention.

FIG. 13 is a top view that shows the mass 1406 caught on the mass removal block 1410. In an example embodiment, a crimping section 1508 of the mass 1406 is crimped around, and thereby grips, the secondary filament 520. Mass 1506 further includes a protruding portion 1510. Mass removal block 1410 includes a corresponding cut away portion 1504 configured to catch the protruding portion 1510 of the mass 1406 when the mass 1406 reaches the mass removal block 1410. The illustrated cut-away portion is provided in a V-shape. According to this illustrated embodiment, the secondary filament 520 does not pass through the mass removal block 1410, but rather only the protruding portion 1510 of the mass 1406 is positioned above the mass removal block 1410.

In an alternative example embodiment, the crimping section 1508 also is positioned above the mass removal block 1410 with the filament 520 extending through the mass removal block 1410. According to this example embodiment, the cutaway portion 1504 of the mass removal block 1410 has a cutaway diameter greater than the diameter of the secondary filament 520 and less than a diameter of the mass 1406. Accordingly, after the mass 1406 and the secondary filament 520 have traveled Z distance, the mass 1406 is removed from the secondary filament 520 and remains seated above the cutaway portion of the mass removal block 1410, while the secondary filament 520 continues to travel downwards under influence of the extruder 512.

In an example embodiment, the secondary filament 520 passes near at least a portion of the mass removal block 1410. To extract the mass 1406, the mass 1406 is configured to demonstrate a characteristic attractive to the mass removal block 1410. Such a characteristic is selected by the designer of the system. Such a characteristic can relate to the magnetism of the material of the mass 1406. If the mass 1406 is selected to be a metal or other magnetic material and a mass removal block 1410 is configured to contain a strong magnet, the magnetic field from the mass removal block 1410 will pry the crimped mass 1406 from the secondary filament 520. Similarly, a characteristic can relate to coordinating materials, such as hook and loop arrangements with a first component of the hook and loop material on the mass 1406 and a second mating component of the hook and loop material on the mass removal block 1410. Any suitably appropriate mechanism for removing a crimped object can be alternatively used.

Figure 14:
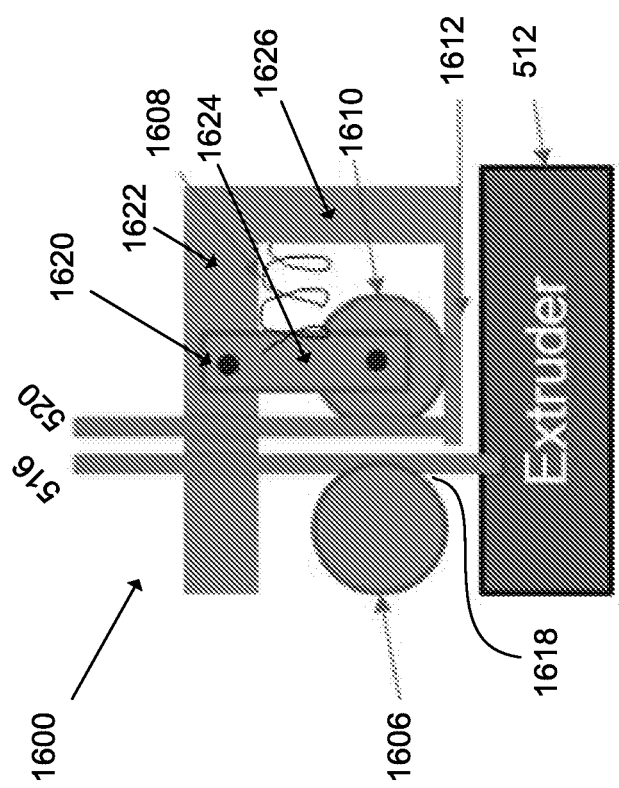
FIG. 14 is a side view of a spring loaded line switcher included in a mechanical automated spool changing system, according to an example embodiment of the present invention.

FIG. 14 is a side view showing a spring loaded line switcher 1600 included in a mechanical automated spool changing system and also shows the extruder 512. Line switcher 1600 includes a guide 1618 having a hollow portion configured to receive only a single filament. In an example embodiment, the guide 1618 is configured to sequentially receive a plurality of filaments from a plurality of spool sources. The guide 1618 is configured to first receive primary filament 516 from the primary spool 514. Following depletion of the primary filament 516, the guide 1618 is then configured to receive secondary filament 520 from the secondary spool 518.

The line switcher 1600 includes a top support 1622, shelf 1612, sliding feed wheel 1610, loading wall 1626, spring 1608, feed bar 1624, guide wheel 1606, and connection point 1620 to apply a lateral force to the secondary filament 520 before the primary filament 516 is depleted. As shown, the force is provided on the secondary filament 520 in a direction perpendicular to the movement of the loaded primary filament 516 during the preloading stage. In an example embodiment, additional filaments up to N filaments are deployed using line switcher 1600. To account for the addition of N-2 filaments, the length of the shelf 1612 is extended to account for the collective filament diameters of the N-2 filaments. In addition, the length of and the elasticity of spring 1608 is adjusted to account for the additional N-2 filaments. The force applied to the secondary filament 520 is generated such that it cannot overcome the blockage force provided by the threaded primary filament 516, but is sufficient to move the secondary filament 520 off of the shelf 1612 after the primary filament 516 is depleted. The primary filament 516 is depleted and the secondary filament 520 is moved off of the shelf 1612, for example, when the top of the primary filament 516 dips below the top surface of the shelf 1612.

Force is generated by a compressed spring 1608 attached at a first end to the loading wall 1626 and at a second end to the feed bar 1624. The feed bar is connected at a top end by the connection point 1620 to the top support shelf 1622 and at a bottom end to a sliding feed wheel 1610. Sliding feed wheel 1610 rolls along a top surface of shelf 1612. Based on the extent to which the spring 1608 is compressed, the spring 1608 exerts a force on the feed bar 1624. When the feed bar 1624 is pushed by the tension force, the sliding feed wheel 1610 begins to roll in a direction towards the secondary filament 604, the feed bar thereby swinging about a rotational axis at the connection point 1620 and towards the guide wheel 1606. The wheel 1610 is pressed against the secondary filament 520 resting on shelf 1612.

The motion of the sliding feed wheel 1610 and its pressing against the secondary filament 520 preloads the secondary filament 520 to move towards the primary filament 516. Additionally, the rolling motion of the sliding feed wheel 1610 along the shelf 1612 preloads the secondary filament 520 to move in a downwards directions towards the extruder 512. When the primary filament 516 is in place, the secondary filament 520 does not move due to the blockage provided by both the primary filament 516 and the shelf 1612. When the primary filament 516 dips beneath the surface of the shelf 1612, the secondary filament 520 is shifted into the position previously occupied by the primary filament 516. Guide wheel 1606 stops the secondary filament 520 from moving beyond the openings of the filament guide 1618 or the extruder 512.

In an example embodiment, connection point 1620 is a pivot point secured by a pin. When the spring 1608 exerts a force on the feed bar 1624, the spring force is transferred into a torque on the feed bar 1624. A pivot connection point 1620 is used in preloading configurations having a number of filaments if the collective diameters of the filaments does not exceed the length of the feed bar 1624. In an alternative example embodiment, the connection point 1620 is slidable parallel to the surface of shelf 1612. Using the slidable connection point 1620, when the spring 1608 exerts a force of the feed bar 1624, the entire feed bar 1624 is displaced (or loaded) in a direction of the spring force. A slidable connection point 1620 is in an example embodiment configured by placing a slidable track along the top support shelf. The slidable connection point 1620 can be implemented when using any number of filaments up to N.

Figure 15:
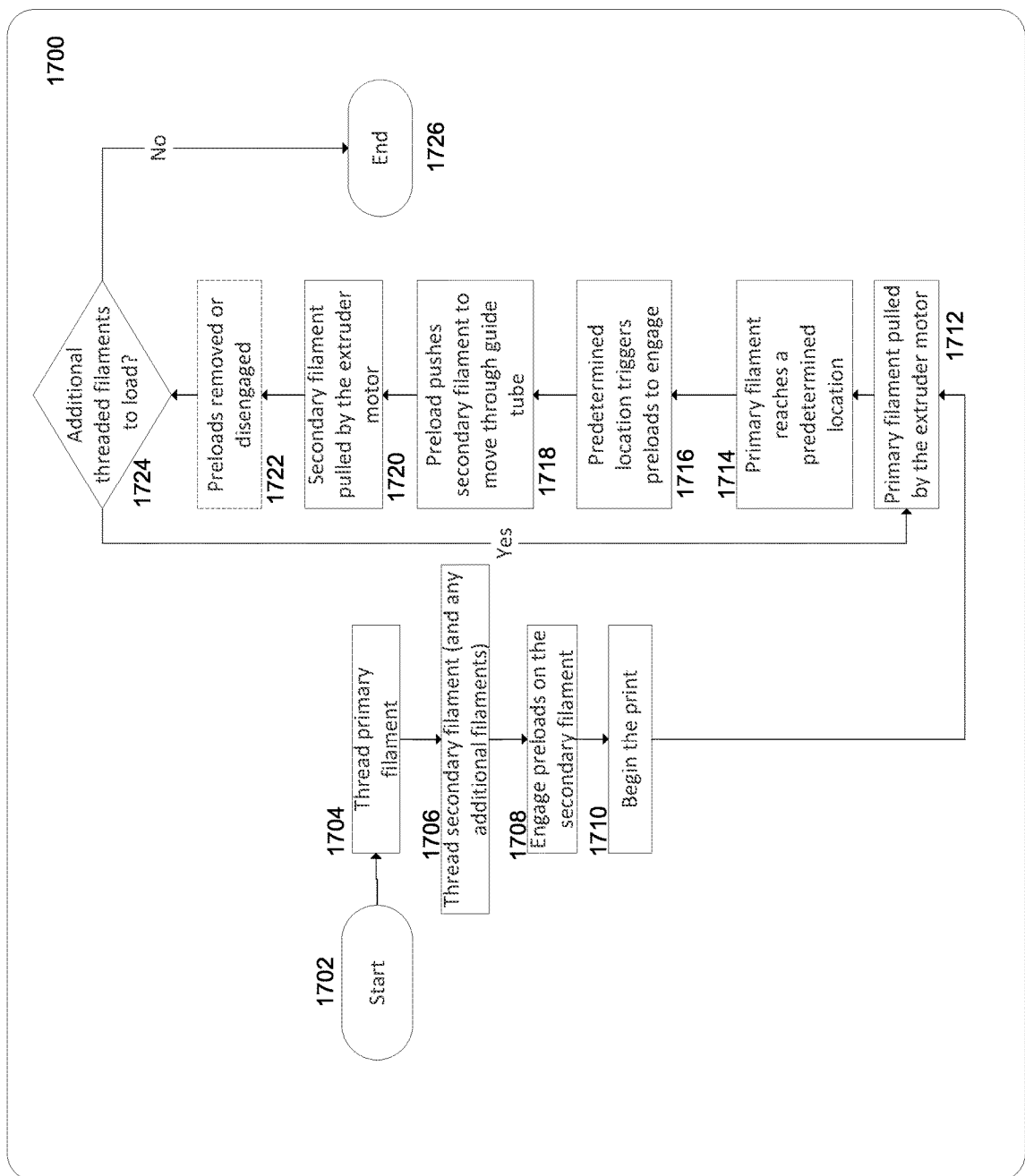
FIG. 15 is flowchart that illustrates a spool changing process for changing a filament source during a build of a 3-D printer using a mechanical automated spool changing system, according to an example embodiment of the present invention.

FIG. 15 is a flowchart that illustrates a spool changing process 1700 for changing a filament source during a build of a 3-D printer using any of the mechanical automated spool changing systems described herein. At 1702, the process begins, and then at 1704, a user of the 3-D printer threads the primary filament through the filament guide structure and into the extruder. At 1706, the user of the 3-D printer threads a secondary filament through a secondary opening in the filament guide structure. In an example embodiment, additional filaments are threaded through respective openings in the filament guide structure. At 1708, a load engages the secondary filament. In an example embodiment, additional filaments are individually engaged by respective loads. Following the loading, the print begins at 1710. The primary filament is pulled by the extruder at 1712. At 1714, the primary filament passes a predetermined location in the filament guide structure. The predetermined location in the filament guide structure is preset as a location in the filament guide structure that indicates that the filament is almost depleted. Once the predetermined location is reached, at 1716, the preloading mechanism from the mechanical automated spool changing system proceeds to exert a preloaded force on the secondary filament.

At 1718, based on the preloaded force and the removal of the blockage from the primary filament, the preload pushes the secondary filament through the guide structure. The secondary filament sequentially follows the primary filament through the filament guide structure and into the extruder. When the extruder receives the secondary filament at 1720, the extruder pulls the secondary filament. In an optional step 1722, the preloaded force is released once or immediately before or after the extruder latches onto the secondary filament. In an example embodiment, releasing the preloaded force is unnecessary due to the force automatically disengaging at a predetermined location measured relative to the surface of the filament guide structure.

At 1724, if additional filaments are loaded in the filament guide structure, the process returns to 1712. If no additional filaments are loaded in the filament guide structure, the process ends at 1726.

Figure 16:
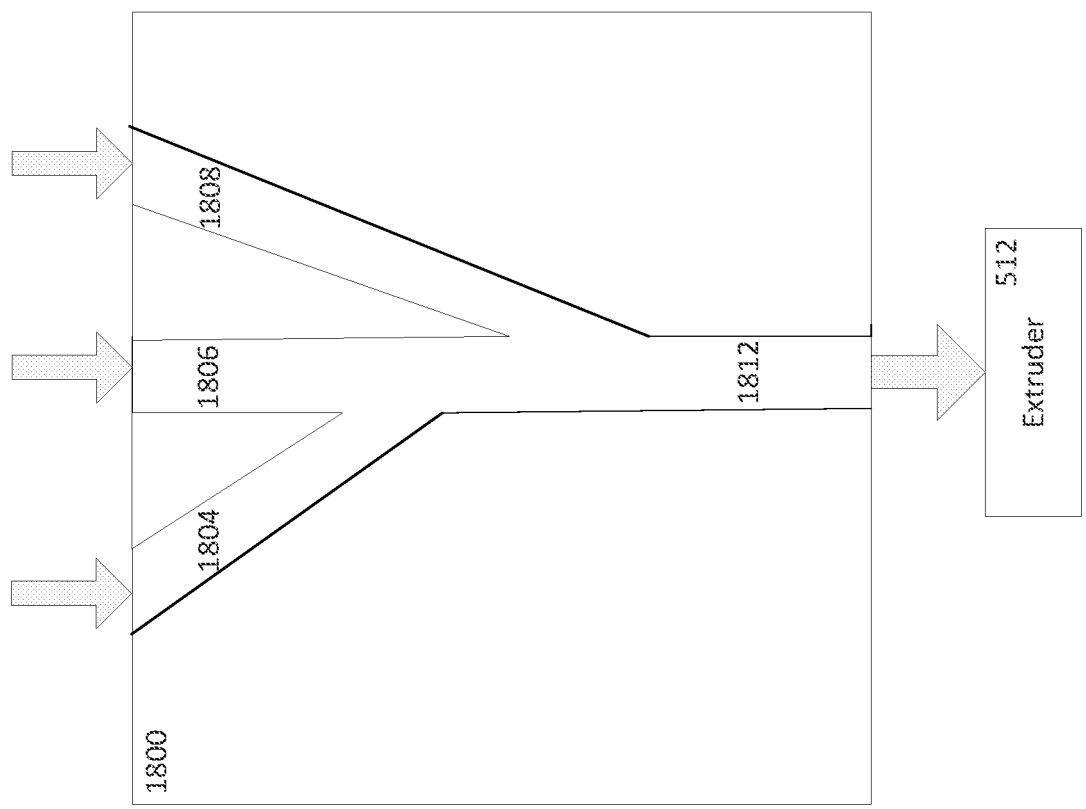
FIG. 16 illustrates a multi-feed filament guide included in a mechanical automated spool changing system, according to an example embodiment of the present invention.

FIG. 16 illustrates a multi-feed filament guide structure 1800 included in a mechanical automated spool changing system. Filament guide structure 1800 is another example detailed view of filament guide structure 508 from FIG. 5 but with the additional capability of automatically loading an additional spool having an additional filament. The hollow portions in the filament guide structure 1802 are arranged in a tree shaped structure. The tree shaped structure includes three branches as input regions including primary hollow portion 1806, secondary hollow portion 1804, and a tertiary hollow portion 1808. The tree shaped structure includes one output region referred to as the shared hollow portion 1812. Although a tree shaped structure is used in the example embodiment shown in filament guide structure 1800, other shapes and variations from the tree shaped structure can be used based on the flexibility of the filament deployed within the filament guide structure and the ability of the pre-loaders to provide tension forces on the secondary filament and the tertiary filament.

During use of the filament guide structure, a primary filament form a primary spool is generally first loaded into the primary hollow portion 1806 and threaded through the shared hollow portion 1812. In some example embodiments, the primary filament is also threaded into extruder 1810 so that the motor of the extruder catches the filament and begins to pull the filament through the extruder. After the primary filament has been loaded, the secondary filament from a secondary spool is loaded into secondary hollow portion 1804. Due to the blockage at the top junction of the tree based on the position of the primary filament, the secondary filament remains within the secondary hollow portion 1804 of the tree shaped structure. After the primary filament has been loaded, the tertiary filament from a tertiary spool is loaded into tertiary hollow portion 1808. Due to the blockage at the bottom junction of the tree based on the position of the primary filament, the tertiary filament remains within the tertiary hollow portion 1808 of the tree shaped structure. The order of loading the secondary filament and the tertiary filament relative to one another is irrelevant.

During a transition to the secondary spool from the primary spool, the top end of the primary filament passes the bottom of the secondary filament at the top junction shown in the tree-shaped structure. After the primary filament passes the secondary filament, the load exerted on the secondary filament by a pre-loader begins to push the secondary filament through the junction immediately following the end of the primary filament. The primary filament that remains from the primary spool is fed into the extruder 1810, and as the extruder 1810 pulls the primary filament, the blockage at the top junction of the tree shape is removed allowing the loaded secondary filament to follow. Due to the load automatically and continuously exerted on the secondary filament, the secondary filament follows the primary filament below the top junction into the shared hollow portion 1812 of the filament guide structure 1800. The secondary filament is then loaded after the primary filament into the extruder 512.

During a transition to the tertiary spool from the secondary spool, the top end of the secondary filament passes the bottom of the tertiary filament at the bottom junction pictured in the tree-shaped structure. After the secondary filament passes the tertiary filament, the load exerted on the tertiary filament by a pre-loader beings to push the tertiary filament through the junction immediately following the end of the secondary filament. The secondary filament that remains from the secondary spool is fed into the extruder 1810, and as the extruder 1810 pulls the secondary filament, the blockage at the bottom junction of the tree shape is removed allowing the loaded tertiary filament to follow. Due to the load automatically and continuously exerted on the tertiary filament, the tertiary filament follows the secondary filament below the bottom junction into the shared hollow portion 1812 of the filament guide structure. The tertiary filament is then loaded after the secondary filament into the extruder 512.

Although the filament guide structure 1800 is depicted as having the hollow portions 1804, 1806, and 1808 all in one plane, in another example embodiment, the hollow portions surrounding the primary hollow portion 1806 need not be in a single plane. The additional hollow guide portions 1804 and 1808 need only on an individual basis be coplanar with the primary hollow portion 1806.

It is noted that, although the described pre-loading systems were indicated to include a primary filament that is fed freely into the filament guide structure and extruder without any pre-load force biasing the primary filament towards the extruder, while being blocked by another filament, in alternative example embodiments, the pre-loading mechanism is duplicated for the primary filament so that after depletion of the primary filament, when the secondary filament is fed into the extruder, the secondary filament can then become the primary filament, with a new filament taking the place of the previous primary filament and being positioned as a new secondary filament. For example, referring to FIG. 7, a second pre-loader 502 can be provided so that initially the primary filament 516 is fed through the threading hole 718 of one of the pre-loaders 502 and into the second bore 704 and the secondary filament 520 is fed through the threading hole 718 of the other of the pre-loaders 502 and into the first bore 702. After the primary filament 516 is depleted, the secondary filament 520 is fed into the extruder 512. While the secondary filament 520 is being fed into the extruder, a user can load a new filament into the pre-loader 502 into which the primary filament 516 had previously been loaded. The secondary filament 520 would now operate to block the newly loaded filament, while the pre-loader 502 exerts the downwards force onto the newly loaded filament, as described above with respect to the force exerted by the pre-loader 502 onto the secondary filament 520. When the secondary filament 520 is then subsequently depleted, the newly loaded filament would then automatically be fed into the extruder 512 as described above. Thus, while a filament is being fed into the extruder 512 via any one of the pre-loaders 502, a user can load a new filaments into the other pre-loader 502 which has been emptied, so that there need not ever be a printing disruption.

The embodiments described above, which have been shown and described by way of example, and many of their advantages will be understood by the foregoing description, and it will be apparent that various changes can be made in the form, construction and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives falling with the spirit and scope of this disclosure.

That is, the above description is intended to be illustrative, and not restrictive, and is provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not be limited to the embodiments shown and described, since various modifications will become apparent to the skilled practitioner upon a study of the drawings, specification, and following claims. For example, components and functionality may be separated or combined differently than in the manner of the various described embodiments, and may be described using different terminology. These and other variations, modifications, additions, and improvements may fall within the scope of the disclosure as defined in the claims that follow.

What is claimed is:

1. A filament refilling system for automatically loading into a 3-D printer extruder a refill filament to replace a first filament, the filament refilling system comprising:

a filament guide configured to receive the first filament, receive the refill filament, and output received filaments to the extruder; and a preloading device that:
  is configured to exert a first force on the refill filament in a direction towards the filament guide and the extruder, which first force, when exerted on the refill filament, causes the refill filament to automatically travel through the filament guide and into the extruder upon removal of a blocking force by the first filament, the filament guide being configured for the removal of the blocking force to occur upon depletion of the first filament; and
  includes (a) a mass crimped to the refill filament thereby applying, as the first force, a gravitational force acting on the mass to the refill filament, and (b) a mass removal block configured to strip the mass from the refill filament responsive to travel of the mass and the refill filament to which the mass is crimped by an amount by which the refill filament reaches a point at which the extruder latches onto the refill filament.

2. The filament refilling system of claim 1, further comprising:

a single filament movement motor arranged below an output channel configured to cause a sequential output of the first filament and then the refill filament by pulling on the first filament and the refill filament respectively from below the output channel, wherein the filament guide and the single filament movement motor are arranged so that:
  while the first filament extends into the output channel, the first filament applies the blocking force; and
  the single filament movement motor is configured to pull the first filament completely through and out of the output channel, so that an end of the first filament is fed through and out of the output channel into the extruder, thereby removing the first filament from the output channel, wherein the removal of the first filament from the output channel removes the blocking force, so that the refill filament is thereby, due to the first force, automatically fed into the output channel and brought under influence of the filament movement motor.

* * * * *